United States Patent
Ueda et al.

(10) Patent No.: US 11,515,644 B2
(45) Date of Patent: Nov. 29, 2022

(54) ELECTROMAGNETIC WAVE SHIELDING AND ABSORBING MOLDED ARTICLE

(71) Applicant: DAICEL POLYMER LTD., Tokyo (JP)

(72) Inventors: Takafumi Ueda, Tokyo (JP); Hirotomo Katano, Tokyo (JP); Hiroshi Katayama, Tokyo (JP)

(73) Assignee: DAICEL POLYMER LTD., Tokyo (JP)

( * ) Notice: Subject to any disclaimer, the term of this patent is extended or adjusted under 35 U.S.C. 154(b) by 0 days.

(21) Appl. No.: 16/760,097

(22) PCT Filed: Oct. 30, 2018

(86) PCT No.: PCT/JP2018/040244
§ 371 (c)(1),
(2) Date: Apr. 29, 2020

(87) PCT Pub. No.: WO2019/088063
PCT Pub. Date: May 9, 2019

(65) Prior Publication Data
US 2020/0335875 A1 Oct. 22, 2020

(30) Foreign Application Priority Data

Oct. 30, 2017 (JP) .............................. JP2017-209055
Mar. 9, 2018 (JP) .............................. JP2018-043083
Oct. 15, 2018 (JP) .............................. JP2018-194176

(51) Int. Cl.
*H01Q 17/00* (2006.01)
*C08K 7/06* (2006.01)
*C08J 5/04* (2006.01)

(52) U.S. Cl.
CPC ............ *H01Q 17/002* (2013.01); *C08J 5/041* (2013.01); *C08K 7/06* (2013.01)

(58) Field of Classification Search
CPC ...... H01Q 1/42; H01Q 17/005; H01Q 17/002; C08K 7/06; C08J 5/041
See application file for complete search history.

(56) References Cited

U.S. PATENT DOCUMENTS 4,664,971 A  5/1987 Soens
4,675,143 A  6/1987 Wakita et al.
(Continued)

FOREIGN PATENT DOCUMENTS

EP  3 617 274 A1   3/2020
JP  61-296066 A   12/1986
(Continued)

OTHER PUBLICATIONS

English translation of International Preliminary Report on Patentability and Written Opinion dated May 14, 2020, in PCT/JP2018/040244 (Forms PCT/IB/326, PCT/IB/338, and PCT/ISA/237).
(Continued)

*Primary Examiner* — Andrea Lindgren Baltzell
*Assistant Examiner* — Yonchan J Kim
(74) *Attorney, Agent, or Firm* — Birch, Stewart, Kolasch & Birch, LLP

(57) ABSTRACT

Provided is an electromagnetic wave shielding and absorbing molded article which has excellent shielding properties and absorbency for electromagnetic waves having a specific frequency. The electromagnetic wave shielding and absorbing molded article includes a thermoplastic resin composition including stainless steel fibers, and the content ratio of the stainless steel fibers in the molded article is from 0.5 to 20 mass %. The electromagnetic wave shielding and absorbing molded article has a thickness from 0.5 mm to 5 mm, and a shielding property of 10 dB or greater and an absorbency of 25% or greater for electromagnetic waves having any frequency in a frequency domain from 59 GHz to 100 GHz.

14 Claims, 1 Drawing Sheet

(56) References Cited

U.S. PATENT DOCUMENTS

| | | | | |
|---|---|---|---|---|
| 6,153,683 A | * | 11/2000 | Enomoto | C08K 3/04 |
| | | | | 524/494 |
| 2014/0093712 A1 | | 4/2014 | Tong et al. | |
| 2016/0111792 A1 | | 4/2016 | Katayama et al. | |
| 2016/0319088 A1 | * | 11/2016 | Saji | C08J 5/04 |
| 2017/0001336 A1 | * | 1/2017 | Tamai | B29B 9/065 |
| 2020/0277457 A1 | * | 9/2020 | Johnson | C08L 83/10 |
| 2021/0108047 A1 | * | 4/2021 | Matsumura | C08K 3/042 |

FOREIGN PATENT DOCUMENTS

| | | |
|---|---|---|
| JP | 2001-223492 A | 8/2001 |
| JP | 2007-74662 A | 3/2007 |
| JP | 2013-107979 A | 6/2013 |
| JP | 2015-7216 A | 1/2015 |
| JP | 6123502 B2 | 5/2017 |
| WO | WO 2008/078847 A1 | 7/2008 |

OTHER PUBLICATIONS

Extended European Search Report dated Jun. 24, 2021, in European Patent Application No. 18874521.0.

* cited by examiner

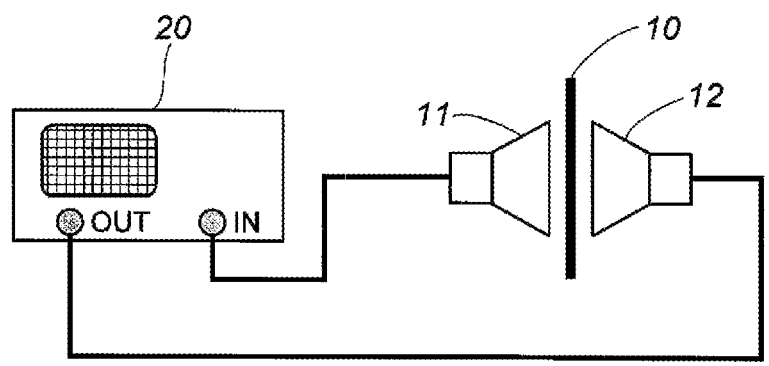

ELECTROMAGNETIC WAVE SHIELDING AND ABSORBING MOLDED ARTICLE

TECHNICAL FIELD

The present invention relates to an electromagnetic wave shielding and absorbing molded article having an advanced capability of shielding and absorbing electromagnetic waves having a specific wavelength.

BACKGROUND ART

A millimeter wave radar device used for the purpose of enabling automated driving and preventing collisions of automobiles is known. A millimeter wave radar device is mounted to various locations such as the front center, both sides, and both rear sides of a vehicle, and is provided with: a high frequency module with an antenna for transmitting and receiving radio waves installed, a control circuit for controlling the radio waves, a housing that houses the antenna and the control circuit, and a radome covering the transmission and reception of radio waves for the antenna (JP 2007-74662 A). A millimeter wave radar device thus constituted transmits and receives millimeter waves using the antenna, and can thereby detect relative distances and relative velocities with respect to an obstacle. The antenna may also receive radio waves reflected from a road surface or other objects besides a target obstacle, and thus there is a risk that the detection accuracy of the device may be reduced. In order to solve this problem, the millimeter wave radar device according to JP 2007-74662 A is provided with a shielding member that shields radio waves between the antenna and the control circuit.

As an invention for solving the problems of the invention of JP 2007-74662 A, a thermoplastic resin composition containing long carbon fibers with a fiber length from 3 to 30 mm, and a molded article that is obtained therefrom and exhibits performance of shielding millimeter waves are proposed (JP 2015-7216 A). In addition, an invention has been proposed with favorable electromagnetic wave shielding properties of a thermoplastic resin molded article containing carbon fibers having an average length from 0.5 to 15 mm (JP 6123502 B).

SUMMARY OF INVENTION

An object of the present invention is to provide an electromagnetic wave shielding and absorbing molded article excelling in a shielding property and an absorbency for electromagnetic waves having a specific frequency.

The present invention provides electromagnetic wave shielding and absorbing molded article including a thermoplastic resin composition containing stainless steel fibers, a content ratio of the stainless steel fibers in the molded article being from 0.5 to 20 mass %, where the electromagnetic wave shielding and absorbing molded article has a thickness from 0.5 mm to 5 mm, and has a shielding property of 10 dB or greater and an absorbency of 25% or greater for electromagnetic waves having any frequency in a frequency domain from 59 GHz to 100 GHz.

The electromagnetic wave shielding property according to the present invention exhibits a combined performance for both absorbency and reflectivity with respect to electromagnetic waves.

Furthermore, by using stainless steel fibers, the electromagnetic wave shielding and absorbing molded article according to the present invention can increase both the shielding property and the absorbency for electromagnetic waves having frequencies from 59 GHz to 100 GHz.

BRIEF DESCRIPTION OF DRAWINGS

FIG. 1 is a schematic diagram of device that was used in the examples to measure the electromagnetic wave shielding property.

DESCRIPTION OF EMBODIMENTS

<Thermoplastic Resin Composition Containing Stainless Steel Fibers>

The thermoplastic resin composition used in the present invention contains stainless steel fibers, and as for the stainless steel fibers, stainless steel fiber itself can be used as is, and may also be used in the form of a master batch made from stainless steel fibers and a thermoplastic resin.

The outer diameter of the stainless steel fibers is preferably from 5 to 20 µm. Examples of the materials for the stainless steel fibers include, but are not limited to, SUS302, SUS304 and SUS316.

One or more thermoplastic resins selected from polypropylenes, propylene unit-containing copolymers and modified products of these, styrene-based resins, polyphenylene sulfides, polyamides, polyethylene terephthalates, polybutylene terephthalates, and polycarbonates can be used, and the thermoplastic resin is preferably one or more selected from polypropylenes, and propylene unit-containing copolymers and modified products of these, and is more preferably a polypropylene.

As the styrene-based resin, a polystyrene or a copolymer containing a styrene unit (such as AS resin, ABS resin, ASA resin, AES resin, and MAS resin) can be used.

When the stainless steel fibers are used in the form of a master batch which contains stainless steel fibers and a thermoplastic resin, a form of a thermoplastic resin-bonded stainless steel fiber bundle (thermoplastic resin-bonded fiber bundle) having a length from 1 to 30 mm, in which stainless steel fibers aligned in a length direction being bundled and integrated with a thermoplastic resin can be used.

The thermoplastic resin-bonded fiber bundle are those which include the following three forms depending on the bonding state of the thermoplastic resin.

(I) A stainless steel fiber bundle in which a resin is penetrated (impregnated) into the center part of the stainless steel fiber bundle such that the resin enters between the fibers of the center part constituting the fiber bundle (hereinafter, referred to as a "thermoplastic resin impregnated fiber bundle").

(II) A stainless steel fiber bundle in which only the surface of the stainless fiber bundle is covered with resin (hereinafter, referred to as a "thermoplastic resin surface-coated fiber bundle").

(III) An intermediate stainless steel fiber bundle of these (where the surface of the stainless fiber bundle is covered with a resin, and the resin is impregnated only in the vicinity of the surface and does not penetrate into the center part) (hereinafter referred to as "partially impregnated thermoplastic resin fiber bundle").

The thermoplastic resin-bonded fiber bundle used in the present invention is preferably a thermoplastic resin-impregnated fiber bundle or a thermoplastic resin surface-coated fiber bundle, and is more preferably a thermoplastic resin-impregnated fiber bundle. The resin-bonded fiber bundles of the forms (I) to (III) can be produced by the method described in JP 2013-107979 A.

The outer diameter of the thermoplastic resin-bonded fiber bundle is preferably from 1.5 to 6.0 mm, more preferably from 1.8 to 5.0 mm, and even more preferably from 2.0 to 4.0 mm, and the length is preferably from 1 to 30 mm, more preferably from 1 to 20 mm, and even more preferably from 3 to 15 mm.

The content ratio of the stainless steel fibers in the thermoplastic resin-bonded fiber bundle is preferably from 20 to 80 mass %, more preferably from 20 to 60 mass %, and even more preferably from 20 to 50 mass %.

For the thermoplastic resin-bonded fiber bundle, a number of the stainless steel fibers included in the bonded fiber bundle is preferably from 1000 to 10000, more preferably from 2000 to 8000, and even more preferably from 3000 to 7000. The cross-sectional shape in the width direction of the thermoplastic resin-bonded fiber bundle is preferably circular or a shape similar thereto, but may also be an oval shape or a shape similar thereto or a polygonal shape or a similar shape.

The thermoplastic resin composition used in the present invention may be made from a master batch only (thermoplastic resin-bonded fiber bundle), which includes stainless steel fibers and a thermoplastic resin, or may be made from the master batch and a thermoplastic resin.

The thermoplastic resin composition used in the present invention can contain a known resin additive within a range at which the problem of the present invention can be solved. Examples of known resin additives include stabilizers with respect to heat, light, UV light, and the like, lubricants, nucleating agents, plasticizers, known inorganic and organic fillers (note that carbon fibers and carbon black are excluded), antistatic agents, release agents, flame retardants, softeners, dispersants, and antioxidants. The total content ratio of the abovementioned known resin additives in the composition (the electromagnetic wave shielding and absorbing molded article) is preferably 5 mass % or less, more preferably 3 mass % or less, and even more preferably 1 mass % or less.

The content ratio of stainless steel fibers in the thermoplastic resin composition (electromagnetic wave shielding and absorbing molded article) used in the present invention is from 0.5 to 20 mass %, preferably from 1 to 15 mass %, more preferably from 1 to 12 mass %, and even more preferably from 2 to 10 mass %.

When the thermoplastic resin composition (electromagnetic wave shielding and absorbing molded article) used in the present invention is formed from a thermoplastic resin and a master batch (thermoplastic resin-bonded fiber bundle) which includes stainless steel fibers and a thermoplastic resin, from the perspective of dispersibility of the stainless steel fibers, the content ratio of the master batch (thermoplastic resin-bonded fiber bundle) in the thermoplastic resin composition (electromagnetic wave shielding and absorbing molded article) used according to the present invention is preferably from 1 to 60 mass %, more preferably from 1 to 50 mass %, and even more preferably from 1 to 40 mass %.

<Electromagnetic Wave Shielding and Absorbing Molded Article>

The electromagnetic wave shielding and absorbing molded article according to an embodiment of the present invention is obtained by molding the thermoplastic resin composition described above through application of a known resin molding method such as injection molding. The size and shape of the electromagnetic wave shielding and absorbing molded article according to an embodiment of the present invention can be appropriately adjusted, according to the application, within a range that satisfies the following thickness requirement.

The length of the stainless steel fibers in the electromagnetic wave shielding and absorbing molded article according to an embodiment of the present invention is preferably from 1 to 30 mm, more preferably from 1 to 20 mm, even more preferably from 3 to 15 mm, and yet even more preferably from 5 to 10 mm. Note that because the stainless steel fibers are not prone to breakage during the molding process, the length of the stainless steel fibers in the composition and the length of the stainless steel fibers in the electromagnetic wave shielding and absorbing molded article are approximately the same.

The electromagnetic wave shielding and absorbing molded article according to an embodiment of the present invention preferably has a thickness from 0.5 mm to 5 mm, more preferably from 1 mm to 5 mm, and even more preferably from 1 mm to 4 mm. The thickness is measured by the method described in the examples.

With the electromagnetic wave shielding and absorbing molded article according to an embodiment of the present invention, the shielding property for electromagnetic waves having any frequency in a frequency domain from 59 GHz to 100 GHz can be preferably set to 10 dB or greater, more preferably to 20 dB or greater, even more preferably to 30 dB or greater, and yet even more preferably to 40 dB or greater. The shielding property is preferably the shielding property for the entire frequency domain from 76 GHz to 100 GHz.

Furthermore, with the electromagnetic wave shielding and absorbing molded article according to an embodiment of the present invention, the electromagnetic wave absorbency for any frequency in a frequency domain from 59 GHz to 100 GHz can be set to 25% or greater, and preferably 30% or greater. The absorbency is preferably the absorbency for the entire frequency domain from 76 GHz to 100 GHz.

The electromagnetic wave shielding property and the electromagnetic wave absorbency of the electromagnetic wave shielding and absorbing molded article according to an embodiment of the present invention can be adjusted by adjusting (R) which is the content ratio and (T) which is the thickness of the stainless steel fibers.

When (R·T) which is the product of the content ratio (R) of carbon fibers in the electromagnetic wave shielding and absorbing molded article (composition) and the thickness (T) of the molded article ranges from 0.5 to less than 6, the electromagnetic wave shielding property in the entire range of frequencies from 70 GHz to 100 GHz can be set to 10 dB or greater, and the electromagnetic wave absorbency can be set to 40% or greater.

When the range of (R·T), which is the product of the content ratio (R) of carbon fibers in the electromagnetic wave shielding and absorbing molded article (composition) and the thickness (T) of the molded article is 6 or greater, and preferably from 6 to 70, the electromagnetic wave shielding property in the entire range of frequencies from 70 GHz to 100 GHz can be set to 50 dB or greater, and the electromagnetic wave absorbency can be set to 20% or greater.

EXAMPLES

Production Example 1

A fiber bundle made from stainless steel fibers (diameter of 11 to 12 μm, approximately 7000 bundlings) was heated at 150° C. using a pre-heating device and passed through a crosshead die. At that time, molten polypropylene (97:3 (weight ratio) mixture of SunAllomer PMB60A (block PP available from SunAllomer Ltd.] and MODIC P908 (acid-modified PP available from Mitsubishi Chemical Corporation)) was supplied to the crosshead die from a twin screw extruder (cylinder temperature: 300° C.), and the fiber bundles were impregnated with the polypropylene. Next, the material was shaped with a shaping nozzle at the outlet of the crosshead die, and the shape was further refined with a shape refining roll, after which the sample was cut to a predetermined length using a pelletizer to obtain pellets (cylindrical molded articles) with a length of 7 mm. The length of the stainless steel fibers was the same as the pellet length. In the pellets obtained in this manner, the stainless steel fibers were substantially parallel in the length direction.

Examples and Comparative Examples

PP1 pellets (pellets obtained in Production Example 1 containing 50 mass % of stainless steel fibers) and PP2 pellets (PMB60A, available from SunAllomer Ltd.) were dry blended, and molded at a molding temperature of 230° C. and a mold temperature of 50° C. using an injection molding machine (α-150 iA, available from Fanuc Corporation), and flat plate shaped electromagnetic wave shielding and absorbing molded articles (150×150 mm) according to an embodiment of the present invention were obtained. The obtained electromagnetic wave shielding and absorbing molded articles were used, and the various measurements shown in Table 1 were performed.
(1) Thickness (mm)

The thickness at a center portion (portion of intersection of diagonal lines) of a flat electromagnetic wave shielding and absorbing molded article (150×150 mm) was measured.
(2) Electromagnetic Wave Shielding Property and Electromagnetic Wave Absorbency The measurement device (network analyzer) illustrated in FIG. 1 was used.

A molded article 10 (length of 150 mm, width of 150 mm, thickness shown in the table) to be measured was held between a pair of horizontally opposing antennas (corrugated horn antennas) 11, 12. The spacing between the antenna 12 and the molded article 10 was 0 mm, and the spacing between the molded article 10 and the antenna 11 was 0 mm. In this state, electromagnetic waves (65 to 110 GHz) were radiated from the lower antenna 12, electromagnetic waves transmitted through the molded article 10 to be measured were received by the upper antenna 11, the electromagnetic wave shielding property (the penetration inhibition of radiated waves) was calculated from Equations 1 and 2 below, and the electromagnetic wave absorbency was calculated from Equations 3 to 6 below.

Electromagnetic Wave Shielding Property (dB)=20 log(1/|$s_{21}$|)  (Equation 1)

$S_{21}$=(Transmitted Electric Field Intensity)/(Incident Electric Field Intensity)  (Equation 2)

In Equation 1, $S_{21}$ represents an S parameter (Equation (2)) showing a ratio of a transmitted electric field intensity to an incident electric field intensity, and can be measured using a network analyzer 20.

In Equation 1, the logarithm of the reciprocal of the S parameter was used to express the electromagnetic wave shielding property (dB) as a positive value. With the measurement device of FIG. 1, a range of from 0 to approximately 100 dB can be measured. Cases in which the electromagnetic wave shielding property exceeded 80 dB are indicated in Table 1 by ">80 (dB)".

$S_{11}$=(Reflected Electric Field Intensity)/(Incident Electric Field Intensity)  (Equation 3)

In Equation 3, $S_{11}$ represent an S parameter showing a ratio of the reflected electric field intensity to the incident electric field intensity, and similar to $S_{21}$, can be measured using the network analyzer.

The absorptivity was denoted as a percentage as expressed by the following formula on a basis of power. The absorptivity is shown in Table 1 as an electromagnetic wave absorbency.

Transmittance (%)=$S_{21}^2$×100  (Equation 4)

Reflectance (%)=$S_{11}^2$×100  (Equation 5)

Absorptivity (%)=100−Transmittance−Reflectance  (Equation 6)

TABLE 1

|  |  |  | Examples | | | | | | | | | | | | | | | | Comparative Examples |
|---|---|---|---|---|---|---|---|---|---|---|---|---|---|---|---|---|---|---|---|
|  |  | Units | 1 | 2 | 3 | 4 | 5 | 6 | 7 | 8 | 9 | 10 | 11 | 12 | 13 | 14 | 15 | ples 1 |
| Composition | PP1 | mass % | 1.0 | 1.0 | 2.0 | 4.0 | 6.0 | 6.0 | 6.0 | 8.0 | 12.0 | 16.0 | 16.0 | 20.0 | 24.0 | 24.0 | 30.0 | 0.0 |
|  | PP2 | mass % | 99.0 | 99.0 | 98.0 | 96.0 | 94.0 | 94.0 | 94.0 | 92.0 | 88.0 | 84.0 | 84.0 | 80.0 | 76.0 | 76.0 | 70.0 | 100.0 |
| Stainless steel fiber ratio (R) |  | mass % | 0.5 | 0.5 | 1 | 2 | 3 | 3 | 3 | 4 | 6 | 8 | 8 | 10 | 12 | 12 | 15 | 0 |
| Molded Article | Thickness (T) | mm | 2 | 4 | 2 | 2 | 0.5 | 2 | 4 | 2 | 2 | 0.5 | 2 | 2 | 2 | 4 | 4 | 2 |
|  | R · T | — | 1 | 2 | 2 | 4 | 1.5 | 6 | 12 | 8 | 12 | 4 | 16 | 20 | 24 | 48 | 60 | 0 |
|  | Shielding property (dB) | 70 GHz | 13 | 16 | 27 | 51 | 10 | 70 | >80 | 53 | 68 | 18 | 80 | >80 | >80 | >80 | >80 | 0 |
|  |  | 76 GHz | 11 | 17 | 28 | 51 | 10 | 69 | >80 | 55 | 72 | 18 | >80 | >80 | >80 | >80 | >80 | 0 |
|  |  | 79 GHz | 10 | 17 | 28 | 51 | 10 | 69 | >80 | 55 | 73 | 18 | >80 | >80 | >80 | >80 | >80 | 0 |
|  |  | 85 GHz | 10 | 16 | 27 | 50 | 10 | 71 | >80 | 55 | 71 | 18 | >80 | >80 | >80 | >80 | >80 | 0 |
|  |  | 95 GHz | 10 | 16 | 27 | 50 | 10 | 73 | >80 | 54 | 70 | 19 | >80 | >80 | >80 | >80 | >80 | 0 |
|  |  | 100 GHz | 10 | 14 | 26 | 49 | 12 | 72 | >80 | 54 | 69 | 21 | >80 | >80 | >80 | >80 | >80 | 0 |
|  | Absorbency (%) | 76 GHz | 87.4 | 95.3 | 95.0 | 70 | 55 | 49 | 71 | 49 | 30 | 44 | 25 | 26 | 27 | 29 | 26 | 0 |
|  |  | 79 GHz | 86.4 | 94.6 | 95.7 | 71 | 54 | 49 | 71 | 51 | 30 | 42 | 26 | 27 | 25 | 26 | 25 | 0 |
|  |  | 85 GHz | 87.4 | 94.8 | 98.3 | 76 | 56 | 55 | 77 | 55 | 31 | 45 | 28 | 29 | 29 | 32 | 27 | 0 |
|  |  | 95 GHz | 89.0 | 96.4 | 98.5 | 79 | 78 | 64 | 83.9 | 52 | 28 | 71 | 26 | 27 | 45 | 50 | 40 | 0 |
|  |  | 100 GHz | 87.5 | 94.4 | 98.3 | 77 | 83.9 | 59 | 81.6 | 52 | 30 | 75 | 29 | 31 | 36 | 39 | 29 | 0 |

As is clear from a comparison of the examples and the comparative example in Table 1, containing a predetermined amount of stainless steel fibers resulted in an excellent electromagnetic wave shielding property in the frequency range from 70 GHz to 100 GHz as well as excellent absorbency for electromagnetic waves having the frequency range from 76 GHz to 100 GHz. Furthermore, the electromagnetic wave shielding property improved as the content ratio of stainless steel became larger, but the electromagnetic wave absorbency was better with less stainless steel content.

INDUSTRIAL APPLICABILITY

The electromagnetic wave shielding and absorbing molded article of the present invention can be used for a millimeter wave radar device loaded in a vehicle for the purpose of enabling automated driving of the vehicle and preventing collisions, and for example, can be used in a shielding member (protective member for a transmitting and receiving antenna) that shields radio waves between the shielding member and a transmitting and receiving antenna control circuit for millimeter wave radar, in a housing for a millimeter wave radar device, and in a member for attaching a millimeter wave radar device, and can also be used in a housing for electrical and electronic equipment for a vehicle or for a device other than a vehicle. Furthermore, the electromagnetic wave shielding and absorbing molded article of the present invention can be used as a protective member for a wireless LAN or broadband wireless access system, a communication satellite, simple radio communications, an on-board radar, or a position recognition system, and more specifically, can be used as a protective member that shields radio waves of a base station antenna, a remote radio head (RRH; radio transceiver device), a baseband unit (BBU) device, a base GaN power amplifier, an optical transceiver, or the like.

The invention claimed is:

1. An electromagnetic wave shielding and absorbing molded article comprising a thermoplastic resin composition including a thermoplastic resin and stainless steel fibers, a content ratio of the stainless steel fibers in the electromagnetic wave shielding and absorbing molded article being from 0.5 to 20 mass %, wherein the electromagnetic wave shielding and absorbing molded article has a thickness from 0.5 mm to 5 mm, and has an electromagnetic wave shielding property of 10 dB or greater and an electromagnetic wave absorbency of 25% or greater for electromagnetic waves having any frequency in a frequency domain from 59 GHz to 100 GHz, and the electromagnetic wave shielding and absorbing molded article is obtained by injection molding a mixture of pellets of a thermoplastic resin and thermoplastic resin-bonded fiber bundles each having a length from 1 to 30 mm, in which the stainless steel fibers aligned in a length direction are bundled and integrated with a thermoplastic resin with a content ratio of the stainless steel fibers being from 20 to 80 mass %, into the electromagnetic wave shielding and absorbing molded article, in which the thermoplastic resin of the pellets and the thermoplastic resin of the thermoplastic resin-bonded fiber bundles are formed into the thermoplastic resin of the thermoplastic resin composition in which the stainless steel fibers are dispersed, wherein the thermoplastic resin of the pellets and the thermoplastic resin of the thermoplastic resin-bonded fiber bundles both include a same thermoplastic resin, which is at least one thermoplastic resin selected from the group consisting of polypropylene, a propylene unit-containing copolymer, and a modified product of these.

2. The electromagnetic wave shielding and absorbing molded article according to claim 1, wherein a fiber length of the stainless steel fibers contained in the electromagnetic wave shielding and absorbing molded article is from 1 to 30 mm.

3. The electromagnetic wave shielding and absorbing molded article according to claim 1, wherein the electromagnetic wave shielding property and the electromagnetic wave absorbency are adjusted by setting (R·T) to be in a range from 0.5 to less than 6, or be equal to or greater than 6, (R·T) being a product of (R), which is a content ratio of stainless steel fibers in the electromagnetic wave shielding and absorbing molded article, and (T), which is a thickness of the electromagnetic wave shielding and absorbing molded article.

4. The electromagnetic wave shielding and absorbing molded article according to claim 1, wherein the electromagnetic wave shielding property and the electromagnetic wave absorbency of the electromagnetic wave shielding and absorbing molded article are for all frequencies from 76 GHz to 100 GHz.

5. The electromagnetic wave shielding and absorbing molded article according to claim 1, wherein the electromagnetic shielding and absorbing molded article is a protective member for a transmitting and receiving antenna.

6. The electromagnetic wave shielding and absorbent molded article according to claim 1, wherein a fiber length of the stainless steel fibers contained in the electromagnetic wave shielding and absorbing molded article is from 5 to 10 mm.

7. The electromagnetic wave shielding and absorbing molded article according to claim 2, wherein the electromagnetic wave shielding property and the electromagnetic wave absorbency are adjusted by setting (R·T) to be in a range from 0.5 to less than 6, or be equal to or greater than 6, (R·T) being a product of (R), which is a content ratio of carbon fibers in the electromagnetic wave shielding and absorbing molded article, and (T), which is a thickness of the electromagnetic wave shielding and absorbing molded article.

8. The electromagnetic wave shielding and absorbing molded article according to claim 2, wherein the electromagnetic wave shielding property and the electromagnetic wave absorbency of the electromagnetic wave shielding and absorbing molded article are for all frequencies from 76 GHz to 100 GHz.

9. The electromagnetic wave shielding and absorbing molded article according to claim 3, wherein the electromagnetic wave shielding property and the electromagnetic wave absorbency of the electromagnetic wave shielding and absorbing molded article are for all frequencies from 76 GHz to 100 GHz.

10. The electromagnetic wave shielding and absorbing molded article according to claim 2, wherein the electromagnetic shielding and absorbing molded article is a protective member for a transmitting and receiving antenna.

11. The electromagnetic wave shielding and absorbing molded article according to claim 3, wherein the electromagnetic shielding and absorbing molded article is a protective member for a transmitting and receiving antenna.

12. The electromagnetic wave shielding and absorbing molded article according to claim 1, wherein the content ratio of the stainless steel fibers in the electromagnetic wave shielding and absorbing molded article is from 2 to 12 mass %, and the thickness of the electromagnetic wave shielding and absorbing molded article is from 1 mm to 5 mm.

13. The electromagnetic wave shielding and absorbing molded article according to claim 1, wherein a number of the stainless steel fibers included in each of the thermoplastic resin-bonded fiber bundles is from 1000 to 10000.

14. The electromagnetic wave shielding and absorbing molded article according to claim 5, wherein the electromagnetic shielding and absorbing molded article is a protective member for a transmitting and receiving antenna.

* * * * *